(12) United States Patent
Bablumyan

(10) Patent No.: US 10,859,833 B2
(45) Date of Patent: Dec. 8, 2020

(54) WAVEGUIDE IMAGE COMBINER FOR AUGMENTED REALITY DISPLAYS

(71) Applicant: TIPD, LLC, Tucson, AZ (US)

(72) Inventor: Arkady Bablumyan, Escondido, CA (US)

(73) Assignee: TIPD, LLC, Tucson, AZ (US)

( * ) Notice: Subject to any disclaimer, the term of this patent is extended or adjusted under 35 U.S.C. 154(b) by 258 days.

(21) Appl. No.: 16/041,347

(22) Filed: Jul. 20, 2018

(65) Prior Publication Data

US 2019/0056593 A1 Feb. 21, 2019

Related U.S. Application Data

(60) Provisional application No. 62/547,411, filed on Aug. 18, 2017.

(51) Int. Cl.
*G02B 27/01* (2006.01)
*G02B 27/44* (2006.01)
(Continued)

(52) U.S. Cl.
CPC ..... *G02B 27/0172* (2013.01); *G02B 27/0081* (2013.01); *G02B 27/1086* (2013.01);
(Continued)

(58) Field of Classification Search
CPC ............ G02B 27/0172; G02B 27/1086; G02B 27/0081; G02B 27/44; G02B 2027/0178;
(Continued)

(56) References Cited

U.S. PATENT DOCUMENTS 6,906,836 B2 6/2005 Parker et al.
8,233,204 B1 * 7/2012 Robbins ............ G02B 26/0808
359/15

(Continued)

FOREIGN PATENT DOCUMENTS

| WO | 2016/020643 A1 | 2/2016 |
| WO | 2017/180403 A1 | 10/2017 |
| WO | 2018/209108 A2 | 11/2018 |

OTHER PUBLICATIONS

Shen, Zhongwen, "Characterization and Optimization of Field of View in a Holographic Waveguide Display," IIEEE Photonics Journal, vol. 9, No. 6, Dec. 2017.
(Continued)

*Primary Examiner* — Kimberly N. Kakalec

(57) ABSTRACT

A waveguide image combiner is used to transmit a monochrome or full-color image in an augmented reality display. The combiner uses multiple pairs of overlapping incoupling and outcoupling VHOEs to expand the horizontal FOV and a Y expander to expand the vertical FOV. This suitably provides an expanded horizontal and vertical FOV that offers a diagonal FOV$\geq 50°$, a horizontal FOV$\geq 40$ and a vertical FOV$\geq 25°$. The combiner also delivers a large horizontal eye box up to 20 mm and a vertical eye box of 10 mm while maintaining high light efficiency of the real scene (e.g. >80%). The system is able to use a light engine based on broadband (10 nm$\leq \Delta\lambda \leq 30$ nm) LEDs and maintain a large horizontal field of view and high transmission of the real imagery. The approach resolves issues with current embodiments including astigmatism, image overlap, color balance, and small light engine pupils leading to reduced eye boxes.

20 Claims, 10 Drawing Sheets

(51) Int. Cl.
*G02B 27/10* (2006.01)
*G02B 27/00* (2006.01)

(52) U.S. Cl.
CPC ........ *G02B 27/44* (2013.01); *G02B 2027/013* (2013.01); *G02B 2027/0105* (2013.01); *G02B 2027/0174* (2013.01); *G02B 2027/0178* (2013.01); *G02B 2027/0196* (2013.01)

(58) Field of Classification Search
CPC .... G02B 2027/0174; G02B 2027/0105; G02B 2027/0196; G02B 2027/013
See application file for complete search history.

(56) References Cited

U.S. PATENT DOCUMENTS

| | | | |
|---|---|---|---|
| 9,513,480 | B2 | 12/2016 | Saarikko et al. |
| 2009/0245730 | A1* | 10/2009 | Kleemann .......... G02B 27/0101 385/37 |
| 2009/0303212 | A1* | 12/2009 | Akutsu .................. G02B 6/124 345/204 |
| 2012/0033306 | A1 | 2/2012 | Valera et al. |
| 2015/0016777 | A1 | 1/2015 | Abovitz et al. |
| 2015/0293358 | A1* | 10/2015 | de Matos Pereira Vieira ............. G02B 27/0172 359/13 |
| 2016/0116739 | A1 | 4/2016 | TeKolste et al. |
| 2016/0124229 | A1* | 5/2016 | Yokoyama ......... G02B 27/4205 359/567 |
| 2016/0161755 | A1* | 6/2016 | Yonekubo .......... G02B 27/0081 345/8 |
| 2017/0276948 | A1 | 9/2017 | Welch et al. |

OTHER PUBLICATIONS

Piao, Jing-Ai, "Full Color Holographic Optical Element Fabrication for Waveguide-type Head Mounted Display Using Photopolymer," Journal of the Optical Society of Korea, vol. 17, No. 3, Jun. 2013, pp. 242-248.
Guo, Jingjing, "Design of a multiplexing grating for color holographic waveguide," SPIE, Optical Engineering 54(12) 125105, Dec. 2015.
Wang et al., "Optical Design of Waveguide Holographic Binocular Display for Machine Vision," Applied Mechanics and Materials ISSN: 1662-7482, vols. 427-429, pp. 763-769, Sep. 27, 2013.
Hunsperger, R.G., "Optical Waveguide Modes," Integrated Optics, DOI 10.1007/b98730 2, Springer Science+Business Media, LLC 2009.
Augmented Reality Module (AR Module), Product Brief, WaveOptics, 2018.
Barden et al, "Volume-Phase Holographic Gratings and the Efficiency of Three Simple Volume-Phase Holographic Gratings," Publications of the Astronomical Society of the Pacific, 112:809-820, Jun. 2000.
Close, D.H., Holographic Optical Elements, Optical Engineering, vol. 14, No. 5, Sep.-Oct. 9, 1975.
Zhou et al., "See-through near-eye displays enabling vision correction," Optical Society of America, Jan. 25, 2017.
Guo et al., "Holographic waveguide display with a combined-grating in-coupler," Optical Society of America, Nov. 9, 2016.

* cited by examiner

DIFFRACTION EFFICIENCY
DISTRIBUTION

WAVEGUIDE IMAGE COMBINER FOR AUGMENTED REALITY DISPLAYS

CROSS-REFERENCE TO RELATED APPLICATIONS

This application claims benefit of priority under 35 U.S.C. 119(e) to U.S. Provisional Application No. 62/547,411 entitled "Waveguide Combiner for Near-to-Eye display with Expanded Horizontal and Vertical Field of View and Large Eye Box" and filed on Aug. 18, 2017, the entire contents of which are incorporated by reference.

BACKGROUND OF THE INVENTION

Field of the Invention

This invention relates to waveguide image combiners for combining real imagery and auxiliary content to generate an augmented reality display.

Description of the Related Art

Combining computer-generated imagery with real imagery exists in a continuous range described as the reality-virtuality continuum [Milgram, Paul; H. Takemura; A. Utsumi; F. Kishino (1994). "*Augmented Reality: A class of displays on the reality-virtuality continuum*" Proceedings of Telemanipulator and Telepresence Technologies. pp. 2351-34.] At one end of the continuum exists "reality", the image reaching the viewer's eye has no computer generated information. At the other end is "virtual reality" where all the information reaching the viewer's eye is displayed by a computer. Within the continuum is mixed or augmented reality where light from a light engine is combined with the real imagery and both reach the viewer's eye. This "auxiliary content" projected by the light engine may include one or more of computer generated imagery, a live or recorded video feed, text or other analog or digital information. In augmented reality applications, the auxiliary scene and the view of the outside world need to be combined and integrated into the observer's field of view (FOV). There are numerous techniques of beam combining that can change the auxiliary content propagation direction in such a way that one can see the auxiliary content and the outside world at the same time.

Augmented display systems are comprised of several subsystems including an image engine that generates the auxiliary content, a light input subsystem that couples the auxiliary content into the viewing device, and a light output subsystem that couples light from the device and transmits the real scene to the viewer's eye. These subsystems are combined into glasses, helmets, or heads up display devices. The glasses-based systems are often called near-to-eye (NTE) displays or NED. If the system combines auxiliary content with a view of the outside world, an image combiner is required to allow the viewer to see both the auxiliary and real content simultaneously. To provide the viewer with the most realistic experience possible, the image combiner and display system should provide a horizontal and vertical FOV that is as large as possible while maximizing the size of the "eye box"—output pupil size at the position of the eye. Current embodiments have diagonal FOVs that are less than 40 degrees and eye boxes of less than 10 mm×10 mm, which negatively impacts the user's experience.

As shown in FIG. 1, one of the most elegant ways to build a waveguide image combiner is the use of waveguide (WG) holography. This technique uses an input Holographic Optical Element (HOE) 14 to trap through total internal reflection (TIR) auxiliary content 32 generated by an image engine 10 inside a transparent substrate 12 where auxiliary content 32 propagates away from the image engine and is outcoupled toward the viewer's eye 24 by an output HOE 20. Both the input and output HOEs are transparent across the entire visible range except for an approximately 20% reduction in transmission across the bandwidth of the broadband RGB light sources. This allows the viewer to see the real imagery 18 and the auxiliary content 32. The light engine and output HOEs emit within a cone of light 28.

The waveguide image combiner has an eye box 26 in the horizontal and vertical directions. The eye box is the vertical and horizontal distance where the viewer's pupil receives all the angles emitted by the light engine. A large eye box is desirable for accommodating eye movement, physical variation among viewers, and mechanical tolerances. As the viewer's pupil moves outside the eye box, the image becomes degraded. Eye relief 22 is the distance between the substrate surface and the entrance pupil of the viewer's eye. For maximum comfort, this distance should be ≥20 mm.

The field-of-view (FOV) 30 is the angular size of the image determined by the geometric relationship between the size of the outcoupling HOE and the distance between the pupil and the surface of the outcoupling HOE. Holographic optical element is a general term that describes a functional diffractive structure that transforms the waveform of the input beam into an output beam. A volume holographic element (VHOE) is a type of HOE [G. Bianco, M. A. Ferrara, F. Borbone, A. Roviello, V. Striano, G. Coppola/ "Photopolymer-based volume holographic optical elements design and possible applications"/J. Eur. Opt. Soc.-Rapid 10, 15057 (2015)], [E. Di Fabrizio, L. Grella, M. Baciocchi, M. Gentili, "Fabrication of Diffractive Optical Elements", Springer, p. 149-160. 1997] that operates in the Bragg diffraction regime. A waveguide image combiner represents the optical system that includes all the optical elements in the optical path from the exit aperture of the light engine to the plane where light enters the eye.

Image combiners using HOEs can operate in either a transmission mode where the light is diffracted as is passes through the HOE or in a reflection mode where the light is diffracted and returns in the opposite direction after striking the HOE. Existing NTE systems based on either reflection or transmission HOEs have demonstrated diagonal FOVs of 40 degrees or less. As shown in the calculations to follow (1), the theoretical maximum angular range that can be coupled into substrate modes using a single recording layer transmission HOE corresponds to a horizontal FOV of 30° (for n=1.5). For simplicity, FOV angles are measured in air and acceptance angles for reflection VHOE are measured inside the substrate. The relationship between the air and substrate angles is described by Snell's law. For the calculations below, the refractive index (n) is assumed to be n=1.5 representing an "typical" glass material (n for glasses ranges from 1.4 to 2.0 see Abbe diagram for examples [https://en.wikipedia.org/wiki/Abbe_number#/media/File:Abbe-diagram_2.svg]).

HOEs operating in reflection mode are always volume holograms (VHOEs). A reflection VHOE is capable of in-coupling into substrate modes (light propagating through Total Internal Reflection (TIR)) corresponding to horizontal FOV of up to 70°. However, a reflection VHOE recorded in a single layer has an acceptance angle of less than 5° because of the high angular selectivity of volumetric holograms (low diffraction efficiency outside 5 degrees). [H. Kogelnik (1969). "Coupled-wave theory for thick hologram gratings". Bell System Technical Journal. 48: 2909. doi:10.1002/j.1538-7305.1969] While expanding the FOV for narrow-band laser-based systems using HOEs with optical power is possible, the resulting small eye-box size (~5 mm), laser speckle, and eye safety concerns, make this approach impractical. The invention shows ways to expand the acceptance angle or FOV for broadband image sources.

A successful image combiner system will need to meet the following objectives

1) High transmission of the light from the real scene of at least 80%.
2) Large auxiliary field of view. Diagonal FOV>50 degrees, Horizontal FOV>40 degrees, and Vertical FOV>25 degrees.
3) Large eye box, at least 20 mm in the horizontal direction and 10 mm in the vertical direction.
4) Ability to accept auxiliary content from broadband (10 nm≤Δλ≤30 nm) LED RGB inputs.

To build a holographic waveguide image combiner capable of meeting the objectives, several issues must be addressed.

1. Holograms are highly dispersive elements (i.e., the diffraction angle varies as a function of wavelength per eqn. 1) and their use for imaging with broadband sources leads to chromatic aberrations.
2. Off-axis image propagation introduces astigmatism that distorts the image.
3. The image bouncing between the transparent substrate surfaces as it propagates between the input and output HOEs, can cause overlapping of the different image regions causing a scrambled output image.
4. The color balance of the light engine must be maintained by the waveguide holographic combiner.
5. To reduce the size and weight of NTE systems, the light engine in NTE systems have small apertures that must expanded to achieve large FOVs.

The first issue can be resolved if the angle of each input ray is equal to that of the output ray. This can be achieved if the image inside the transparent substrate (WG) is located at the infinite conjugate plane (Fourier-image) where each direction of the rays corresponds to a particular point of the image. This approach also eliminates the lateral and axial chromatic aberration with broadband sources. This requires that both input and output HOEs be planar gratings without optical power in order to leave the conjugate plane of the image intact. The planar grating (hologram formed using two collimated beams) used for the input and output HOEs also resolves issue 2 since the astigmatism introduced by the off-axis input, will be compensated with the same off-axis output angle. Infinite-conjugate projection will resolve issue 3 because the beams shift after each bounce but do not shift the image located at infinity.

Light engines are designed to achieve a certain white balance (the ratio between the primary emission wavelengths that provide a natural looking image—white balance is typically expressed in degrees Kelvin of a black body source producing the same spectral distribution). The WG image combiner must maintain the white balance of the light engine along the optical path to the viewer's eye. The specular properties of an HOE can change by factors of 2 or more over wavelength changes of a few nanometers. Issue 4 can be addressed for broadband LED sources in the waveguide image combiner by balancing the change in wavelength with a corresponding change in angle to provide constant transmission efficiency across the emission spectrum of the three LEDs.

The FOV limitations are different in the direction of image propagation in the substrate (horizontal) and perpendicular to it (vertical) and can be improved using different techniques described below.

To accommodate consumer demand for a large FOV, innovative techniques are needed to improve the user's overall experience. While either transmission or reflection HOE could be implemented in the display, only reflection HOEs can provide a large horizontal FOV. Transmission HOEs can be used in the waveguide image combiner when the angular requirements on the FOVs are smaller.

The relationship between the input angles and the output angles of an HOE can be analyzed using the well-known diffraction formula:

$$dn(\sin\theta_{in} + \sin\theta_{out}) = \lambda \quad (1)$$

or $$(\sin\theta_{in} + \sin\theta_{out}) = \frac{\lambda}{dn} = const$$

The diffraction geometry of the WG HOEs assumes that the axis of the cone of input angles $\theta_{in}$ should be close to normal and that the diffracted beams should be in the range between substrate critical and sliding angle ($\theta_{out}$=90°):

$$\sin^{-1}\left(\frac{1}{n}\right) < \theta_{out} < 90° \quad (2)$$

in order to propagate along the axis of the transparent substrate.

As defined in FIG. 2a and Equation (2), for a transmission input HOE 50 on a substrate 56, the variation of $\sin(\theta_{out})$ for a diffracted beam 54 for a substrate with n=1.5 is about 0.34, and straightforward calculations show that the range of input angles 60 for the input beam is limited to ~20° ($\theta_{max}$ 58-$\theta_{min}$ 52) inside the transparent substrate and ~30° outside of it. This limits maximum horizontal FOV for transmission HOEs. To achieve a wider FOV, reflection VHOEs should be used. The NTE application must employ phase holographic elements since amplitude holographic elements would reduce the light available.

As defined in FIG. 2b, for a reflection input VHOE 62 on a substrate 56, the range of input angles 70 at a central angle $\theta_{in}$ 68 for the input beam and range of output diffracted angles 64 at central angle $\theta_{dif}$ 66 are symmetrical relative to the normal 72 of the planes of HOE's diffraction pattern and consequently have the same range of angular variation. Thus, according to (2) diffracted beams will be in-coupled into substrate modes if the input beam angles stay within a ~47° angular range inside the substrate (for n=1.5 substrate) and ~70° in the air. This theoretical value for the range of input angles that can be in-coupled into substrate modes for reflection HOE's, is limited by a high angular selectivity of reflection VHOEs, which have significant diffraction efficiency only for the angles close the Bragg angle [Schields, P. "Bragg's Law and Diffraction". http://www.journey.sunysb.edu/ProjectJava/Bragg/home.html. 4/10/02.]. One way to increase the acceptance angle of reflection VHOE is the use of holographic materials with exceptionally high Δn(≥0.1). [Coupled Wave Theory for Thick Hologram Gratings, Herwig Kogelnik, Bell System Technical Journal, Volume 48, Issue 9 pages 2909-2947, November 1969]. This decreases the penetration depth of the input beam and, correspondingly, decreases the angular selectivity of the hologram. However, recording materials with exceptionally high Δn reported in the literature [T. A. Shankoff, "Phase Holograms in Dichromated Gelatin", Applied Optics, October 1968/vol. 7, No. 10, pp. 2101-2105.], are not well suited for WG applications because of their high absorption and scattering affects.

Both horizontal and vertical FOV are limited by the distance from the aperture stop of the image engine to the center of the output HOE. In a typical design, this is measured from the temple arm of the glasses to the center of the lens of the transparent substrates (eye straight view), shown in FIG. 1. For a typical human head, this distance is about ~35-40 mm. In order for NTE glasses to accommodate size, weight, and power restrictions, the size of the image engine should be as small as possible. In some designs [US20180052277 Multi-Layer Diffractive Eyepiece, Magic Leap, Brian T. Schowengerdt, Dianmin Lin, Pierre St. Hilaire.], this makes the size of the aperture stop (pupil) as small as 5 mm in diameter in relation to the desired Vertical FOV of 25°. In this case, the limitation on vertical FOV can become significant and would need to be expanded. Pupil expansion in the horizontal direction is naturally provided by the waveguide geometry of the combiner. This is because the image experiences multiple bounces in the direction of the output HOEs and each bounce of the image shifts the images angular view. Consequently, multiple bounces result in the expansion of the horizontal FOV. Below we describe several ways of to expand the pupil in vertical direction, prior art demonstrates several ways of doing this [US20180052277 Multi-Layer Diffractive Eyepiece, Magic Leap, Brian T. Schowengerdt, Dianmin Lin, Pierre St. Hilaire]. Companies in this field have demonstrated combiners that use surface relief gratings for incoupling, vertical expansion, and outcoupling purposes. One of the shortcomings of surface relief gratings (SRG) is their overall light efficiency in NTE applications. These surface structures introduce multiple orders where >50% of the light can be lost for each HOE. Because SRG are transmission gratings, they are also limited to only 25-30° FOV for a single layer. They also don't allow for RGB to be incoupled using one layer because of color separation and need at least two layers separated by an air gap to produce a full-color image. Subsequently, this causes a color variation where one side of the image will appear redder, and the other bluer. These surface relief gratings provide a transmission efficiency of <50%, an expanded vertical FOV of at most 15° and require multiple films for multiple colors.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention is a waveguide image combiner used to transmit a monochrome or full-color image in an augmented reality display. The combiner suitably provides an expanded horizontal and vertical FOV that offers a diagonal FOV≥50°, a horizontal FOV≥40 and a vertical FOV≥25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤30 nm) LEDs and maintain a large horizontal field of view and high transmission of the real imagery. The approach resolves issues with current embodiments including astigmatism, image overlap, color balance, and small light engine pupils leading to reduced eye boxes.

The waveguide image combiner of the present inventions overcomes the issues and limitations on both H and V FOV expansion associated with surface relief gratings. To expand the H FOV, the present invention uses reflection VHOEs. Since VHOEs only have one diffraction order (as opposed to multiple orders in surface relief gratings), a more efficient use of the light is achieved. In addition, VHOEs are able to outcouple all of the light contained in the image. The high outcoupling efficiency is achieved by fabricating a VHOE that has a gradient diffraction efficiency across the propagation path, and allows for an even distribution of the light to the viewer's eye.

A Y expander (that does not use surface relief gratings) is used to expand the vertical FOV and improve the overall light transmission through the system. This is accomplished by replicating the light engines small aperture multiple times in the vertical direction. A uniform intensity of the copies is achieved by adjusting the intensity of each copy to an identical value. The duplication can be accomplished with reflecting elements such as mirrors or prisms or diffractive elements such as HOEs. The Y expander provides transmission efficiencies of >80%, an expanded FOV of at least 25° and is compatible with the single-film incoupling and outcoupling VHOE design.

In an embodiment, a waveguide image combiner combines light from real imagery with light representing auxiliary content from a light engine to present augmented reality to a viewer. The waveguide imager combiner includes a first optically transparent substrate having top and bottom surfaces and at least first and second pairs of incoupling and outcoupling reflective VHOEs spaced apart horizontally and overlaid on the top surface of the optically transparent substrate. The incoupling VHOEs are configured to diffract light from the light engine in first and second non-overlapping but contiguous angular ranges horizontally into the substrate where the light travels through total internal reflection (TIR) to the outcoupling VHOEs which diffract the light to the viewer with a horizontal FOV equal to the extent of the first and second angular ranges. The reflective VHOEs transmit light from the real imagery across the entire visible spectrum with an approximately 20% reduction at the wavelengths of light from the light engine so that light from real imagery is combined with the light from the light engine to create an integrated image.

In different embodiments, the VHOEs may include a single grating configured to reflect light at a center wavelength with a bandwidth between 10 nm and 30 nm or R, G and B gratings in a single optical film configure to reflect light at R, G and B wavelengths each with a bandwidth of at least 10 nm.

In an embodiment, the outcoupling VHOEs are configured with a gradient in their diffraction efficiency in the horizontal to provide uniform light intensity in the horizontal FOV.

In an embodiment, a Y-expander is configured to duplicate a pupil of the light engine vertically N time where N is an integer of at least two such that each duplicate image has an intensity of 1/N said at least first and second pairs of incoupling reflective VHOEs extending vertically on the top surface of the substrate to capture the N copies of the pupil which expands to fill the vertical extent of the outcoupling VHOE and presents a vertical FOV equal to N times the FOV possible with a single pupil. The Y expander provides transmission efficiencies of >80%, an expanded FOV of at least 25° and is compatible with the single-film incoupling and outcoupling VHOE design. In different embodiments, the duplication may be accomplished with reflecting elements such as mirrors or prisms or diffractive elements such as HOEs.

In an embodiment, a full color image combiner combines auxiliary content from a light engine having a bandwidth of 10 nm to 30 nm. The image combiner exhibits a horizontal FOV of at least 28 degrees (preferably at least 40 degrees) and a vertical FOV of at least 20 degrees (preferably at least 25 degrees) producing a diagonal FOV of at least 35 degrees and preferably at least 50 degrees. They eye box is at least 20 mm×10 mm and the image combiner satisfies the four objects and five issues previously discussed for a successful image combiner system.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
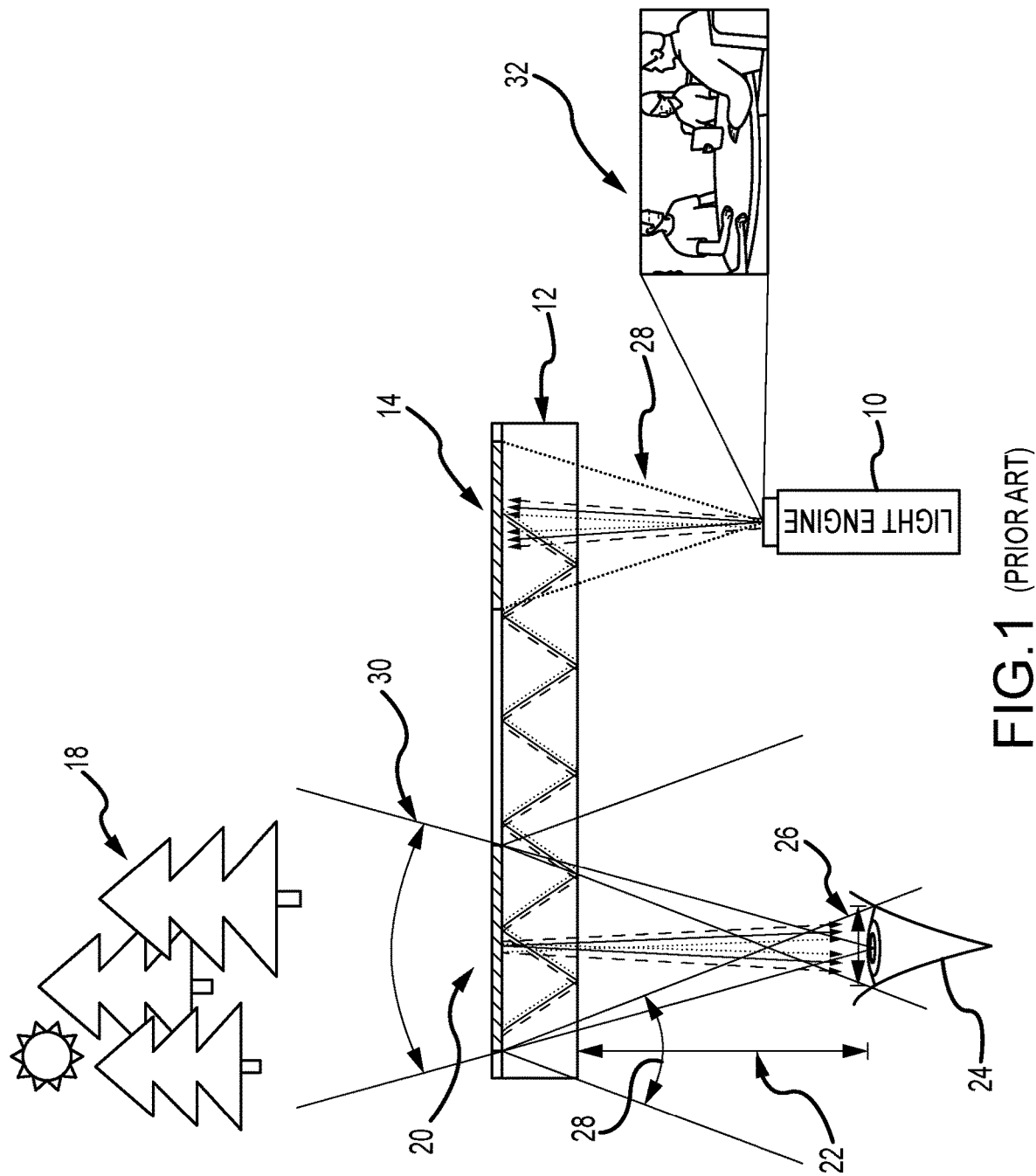
FIG. 1, as described above, is a drawing of an image combiner using waveguide holography.
Figure 2:
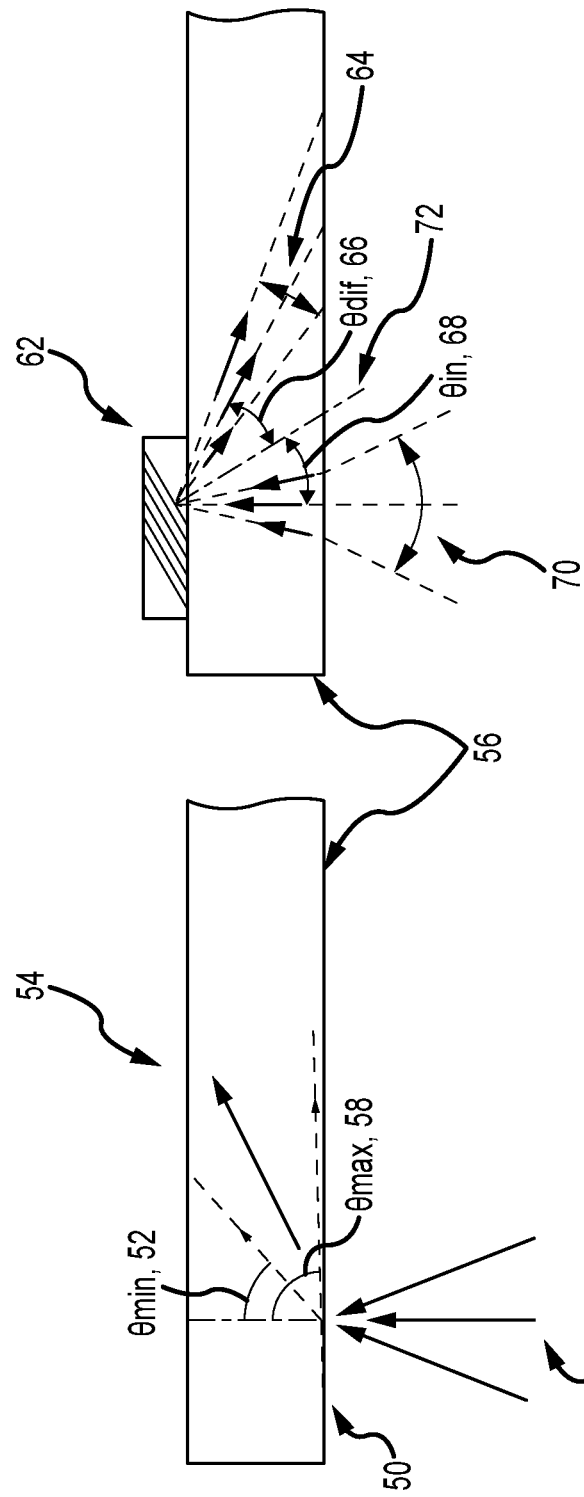
FIGS. 2a and 2b, as described above, are diagrams of transmissive and reflection holograms, respectively, showing the range of angles that can propagate in the substrate.

The present invention describes a waveguide image combiner used to transmit a monochrome or full-color image in an augmented reality display. The combiner suitably provides an expanded horizontal and vertical FOV that offers a diagonal FOV≥50°, a horizontal FOV≥40 and a vertical FOV≥25°. The combiner also delivers a large horizontal eye box up to 20 mm and a vertical eye box of 10 mm while maintaining high light efficiency of the real scene (e.g. >80%). The system is able to use a light engine based on broadband (10 nm≤Δλ≤30 nm) LEDs and maintain a large horizontal field of view and high transmission of the real imagery. The approach resolves issues with current embodiments including astigmatism, image overlap, color balance, and small light engine pupils leading to reduced eye boxes.

Expanded Horizontal FOV

As was stated above, although reflection VHOEs allow image incoupling into single substrate modes up to 70° FOV, a large angular range can't be achieved with a single reflection VHOE due to its small input acceptance angle (approximately 4-5 degrees) for a narrowband laser source. Narrowband sources introduce safety and image quality concerns and reduce the eye box size. Most light engines employ broadband LED sources to overcome these issues. The light from the broadband source in the light engine is emitted at a range of angles that reaches the VHOE.

The input VHOE is designed to collect as large a range of angles as possible (large FOV) and to maintain the white balance of the output image be capturing the one or more illumination colors and the bandwidth of each color in the light engine. Reflection VHOEs can maintain high diffraction efficiency for a large angular range as long as the combination of wavelength and incidence angle satisfy the Bragg condition (3). A LED bandwidth of +/−15 nm will be diffracted from the VHOE at different angles covering an angular range of approximately 10° according to (3) while maintaining white balance in the image as we explain it bellow. The tradeoff is bandwidth of each color vs angular range. The more bandwidth for each color, the less angular range that is available to avoid overlapping.

To provide the best user experience, the system must transmit as much of the auxiliary content (full color, broad bandwidth, and large vertical and horizontal FOVs) as possible through the substrate using total internal reflection. The maximum angular range for transmission gratings is approximately 20° inside the substrate and 30° outside. Existing embodiments using transmission VHOE suffer from reduced FOV and monochrome operation due to the limited angular range available in the substrate. Surface relief grating experience similar issues due to the multiple diffraction orders creating cross talk between the various angles. Reflection VHOEs enable a larger angular range inside the substrate (up to 74°), which enables with proper design of the VHOEs, full color, high brightness, and large diagonal FOV to be achieved.

Figure 3:
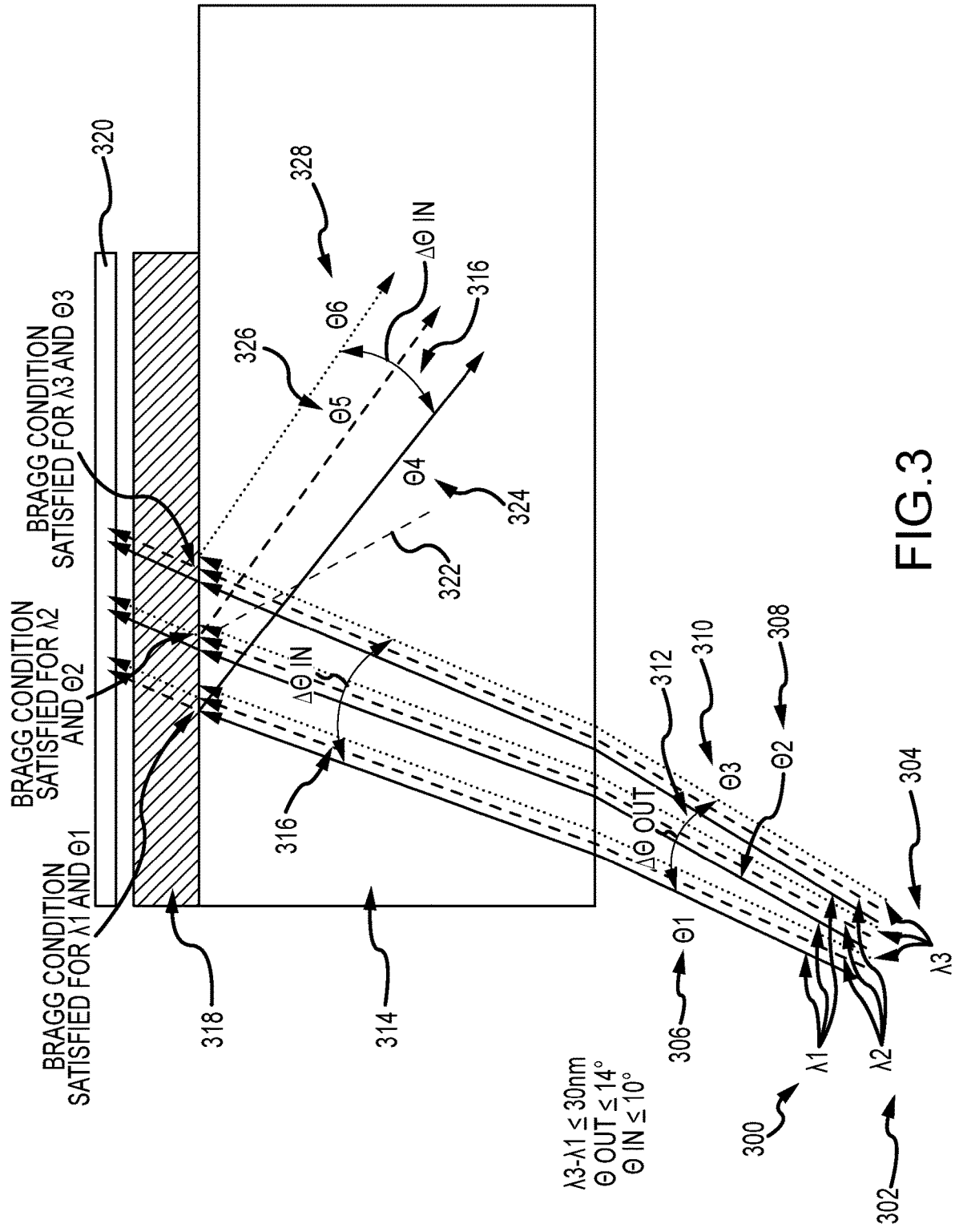
FIG. 3 is a diagram illustrating the expansion of the angular acceptance with broadband sources.

As shown in FIG. 3, a VHOE 318 is able to diffract and trap within the substrate 314 light from the light engine at a large acceptance angle 316 $\Delta\theta_{IN}$ composed of angles in the range from |θ4 324-θ5 326-θ6 328| corresponding to 14° FOV $\Delta\theta_{OUT}$ 312 composed of angles in the range from θ1 306 to θ2 308 to θ3 310 and broadband light from the LED sources |λ1 300-λ3 304|≤30 nm. At each point in the input VHOE 318 a combination of wavelength and angle satisfy (3) and that light is diffracted into the substrate mode, the remaining light is transmitted and absorbed by the absorber 320 or otherwise removed from the system. The light emitted from the broadband source at λ1 300 is diffracted at θ4 324, the light at λ2 302 is diffracted at θ2 326, the light at λ3 304 is diffracted at θ3 328 relative to the normal 322 of the grating vector of the VHOE. This configuration captures the wavelength range of the broadband source emitted over a 14° FOV within the substrate with each wavelength traveling at a slightly different angle. At the output VHOE the process is reversed and the broadband image is created with the 14° FOV. A full color image can be created by three broadband RGB beams whose relative intensities are properly adjusted to provide a white balance. The white balance is maintained because each layer contains three simultaneously printed VHOEs—one for each of the primary colors. Each VHOE is able to couple the broadband output of the LED into the substrate modes, $$2dn\sin(\theta)=\lambda \quad (3)$$

where ($\theta$) is the incident angles, $\lambda$ is the wavelength and d is the grating spacing.

In accordance with one aspect of the invention, the high angular selectivity of reflection VHOEs allows multiple VHOEs (each on a separate film layer) to be physically overlaid on the single substrate and mechanically aligned to increase the total acceptance angle of the combiner. Each VHOE accepts the input from only one non-overlapping range of angles. The VHOEs independently redirect the input angular region into the substrate with different angles to eliminate cross-talk between the input angular ranges. A monochrome VHOE includes a single grating in the film layer. A color VHOE may include three gratings tuned to R, G and B wavelengths in the single film layer. In an embodiment, a two layer pair of VHOEs can expand the horizontal FOV up to approximately 28 degrees and a three layer pair of VHOEs can expand the horizontal FOV up to approximately 42 degrees. For a 42 degree horizontal FOV, the system will have a diagonal FOV of approximately 50 degrees. In other embodiments, more VHOEs may be configured to expand the horizontal FOV to approximately 60 degrees for a single substrate.

Figure 4:
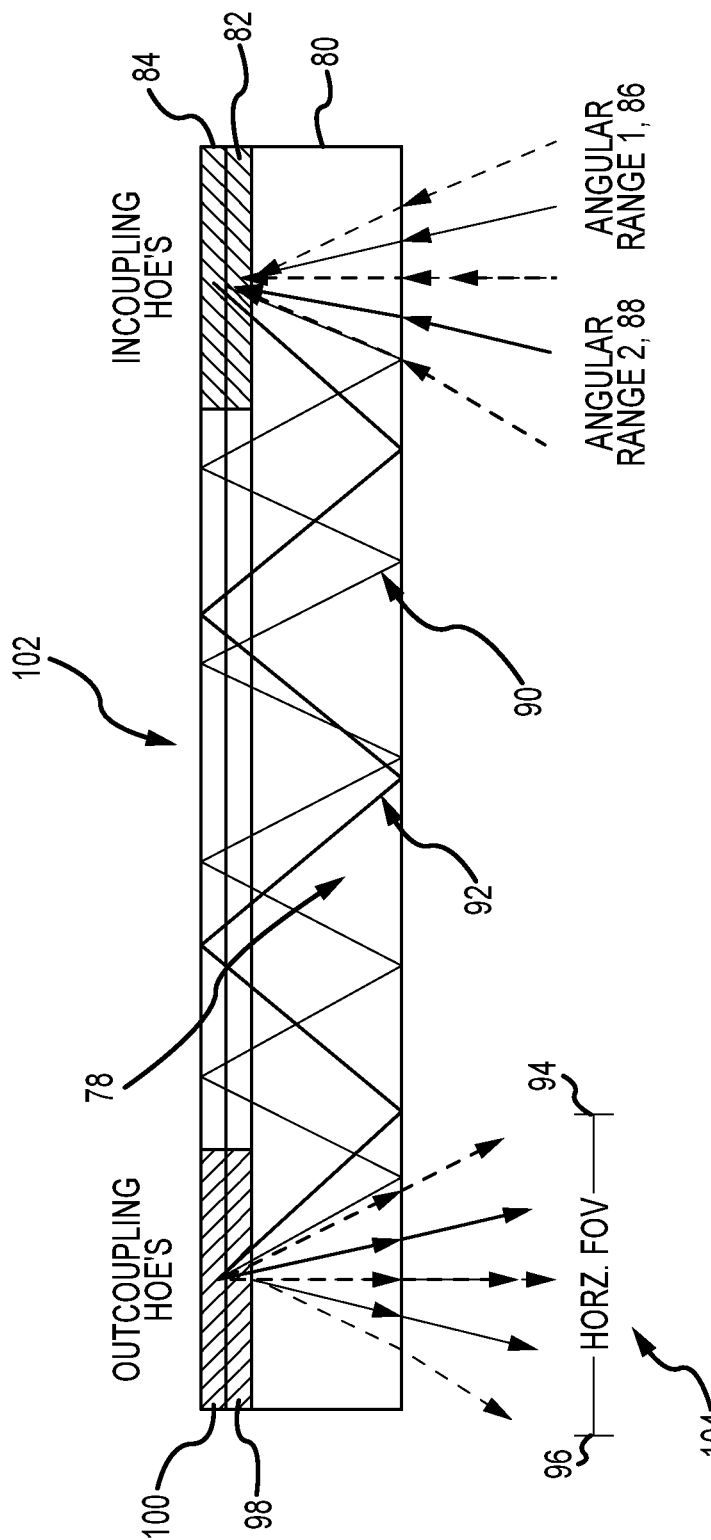
FIG. 4 is a diagram of an embodiment of an image combiner that physically overlaps two reflection input VHOE gratings tuned to different input angular ranges to expand the horizontal FOV.

As shown in FIG. 4, in an embodiment an image combiner 78 can be constructed from a multiplicity of matched input and output VHOEs to expand the horizontal FOV. In this embodiment two (or more) overlapping VHOE incoupling/outcoupling pairs, 82/98 and 84/100 are attached to substrate 80. Input VHOE 1 82 diffracts the three primary colors emitted by the light engine but only at a cone of angles within input angular range 1 86 and directs them into the substrate along path 90. The angles not in angular range 1 86 are transmitted through VHOE1 to VHOE2 84. The cone of angles in angular range 2 88 are transmitted through VHOE1 82 and are diffracted by VHOE2 84 into the substrate 80 along path 92. To avoid a gap in the outcoupled image, the angular ranges are preferably contiguous but non-overlapping. When substrate modes 90 and 92 reach the outcoupling VHOEs, the diffraction process is reversed. The rays from angular range 1 86 that travel along light path 90 are diffracted by outcoupling VHOE1 98 into angular range 1 96. Similarly, light in angular range 2 88 that travels along substrate mode 92 passes through VHOE1 98 since it is not at the correct angle and is diffracted by VHOE2 100 into output angular range 2 94. Each reflection output VHOE independently out-couples adjacent image cones into a doubled horizontal FOV 104. The number of input/output VHOEs can be increased beyond two if the angular ranges of diffracted beams from each VHOE pair can be separated from each other inside the substrate to eliminate cross-talk between them. As stated above, this is possible for up to a 70° in a single substrate (in practice 60° to eliminate using sharp angles close to 90°) horizontal FOV. The manufacturing and assembly process can be simplified and the imaging performance improved by using one large piece having input/output VHOE pair and an unexposed region 102 between them.

For an input image produced using multiple broadband sources, for example three LEDs with 30 nm bandwidth centered in the red, green, and blue portions of the visible spectrum, the bandwidth of each component will be diffracted into a cone of angles inside the substrate. Each incoupling and outcoupling VHOE includes three simultaneously printed diffraction gratings in a single film, one grating for each of the R, G and B colors. The three grating are simultaneously printed using three narrow lasers. In FIG. 4, rays 90 and 92 become a collection of rays that encodes angular and spectral information about the input signal. When the collection of rays diffracts from its complementary output VHOE the spectral and angular information contained in the input signal is restored. Proper selection of the output propagation angle of the HOE allows multiple HOE to accept different input angular ranges and redirect them along different propagation angles in the substrate without any cross talk. Additional VHOEs can be added to further increase the horizontal FOV to its maximum value.

Figure 5A:
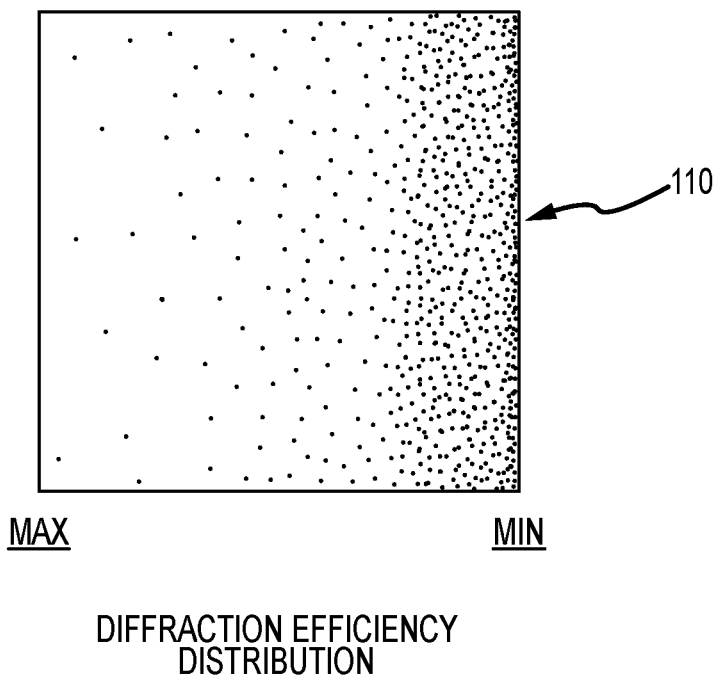
FIGS. 5a and 5b are diagrams showing the distribution of the diffraction efficiency for the output HOE in which the diffraction efficiency varies linearly along the propagation (horizontal) axis and is constant along the vertical axis to produce a uniform intensity of the auxiliary content as it exits the output VHOE.
Figure 5B:
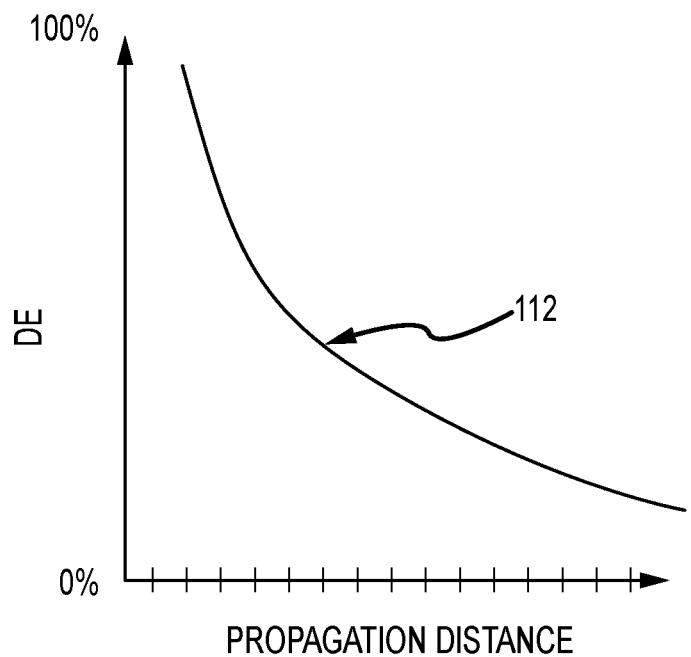

To achieve a uniform brightness or intensity, the diffraction efficiency of the output HOEs must be varied along the image propagation direction. Such a variation can be achieved by varying the contrast of the interferometric pattern during VHOE recording. It can be done using a gradient mask 242 in the path of one of the recording beams as it is shown on FIG. 9b. FIG. 5a shows the DE of an outcoupling HOE 110 for the right eye waveguide combiner. In either the right eye or left eye combiner the DE is lowest (min) on the input VHOE side of the output VHOE and highest of the side farthest away from the input VHOE. As shown in FIG. 5b, the transition between the minimum and maximum DE is structured to provide constant output intensity 112. The DE is constant in the vertical direction.

Expanded Vertical FOV

Various pupil-expanding elements (called Y expanders) have been designed to meet the requirements (see above) for both vertical FOV and eyebox in the vertical direction. Each of these embodiments is compatible with the monochrome and full color horizontal FOV expansion techniques and substrate propagation described above.

The goal of the Y expander is to duplicate, with uniform intensity, the pupil (aperture) of the light engine to maximize the vertical eye box. All embodiments replicate the pupil N (where N is an integer) times with each copy of the image having an intensity of 1/N. The pupil image can be divided using diffraction or reflection.

Figure 6:
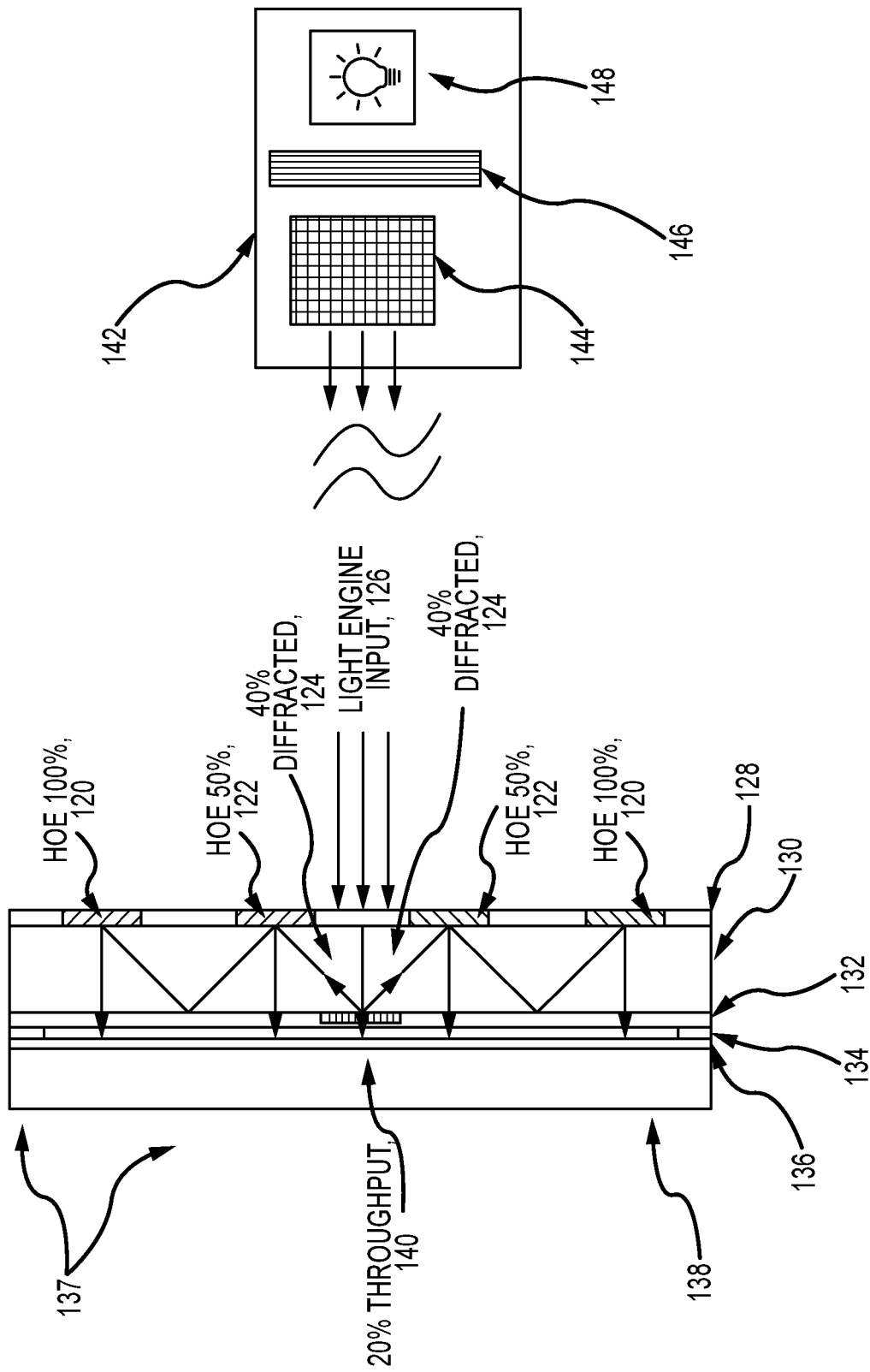
FIG. 6 is a diagram of an embodiment of a Y-expander in which a transmission HOE is added to the substrate on the side of the image engine and exhibits a variable diffraction efficiency to allow uniform intensity to exit the input VHOE.
Figure 7:
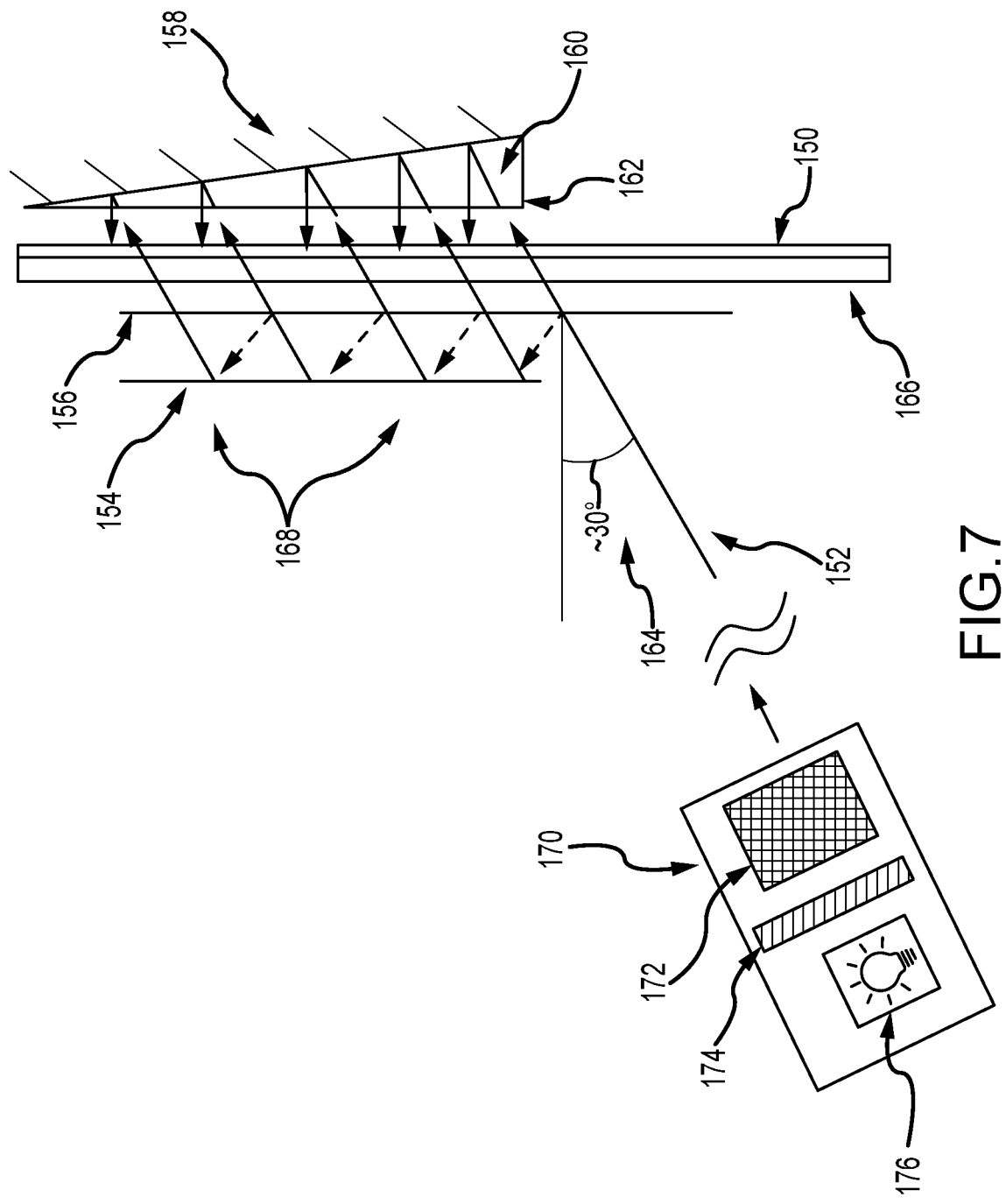
FIG. 7 is a diagram of another embodiment of the Y-expander in which a prism is added to the image engine side of the substrate and a gradient mirror and a fully reflecting mirror are added behind the reflection HOE to produce a uniform intensity for the light exiting the input HOE.
Figure 8:
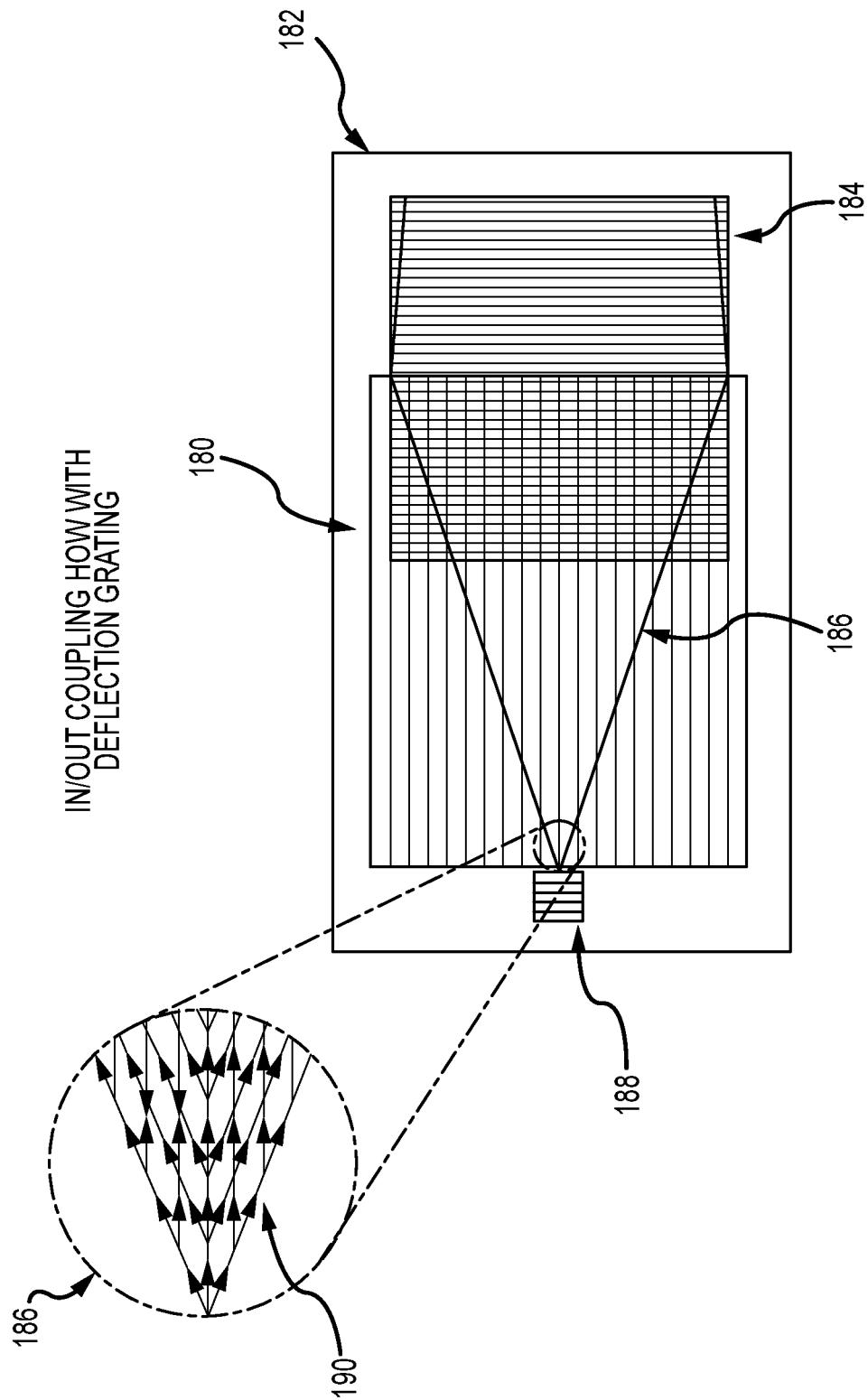
FIG. 8 is a diagram of another embodiment of the Y-expander in which a single film working for all angular ranges is used to distribute the light uniformly over the y-direction of the output HOE.

FIGS. 6 and 7 represent designs where the light engine pupil 126, 152 is duplicated in the vertical direction. The design in FIG. 6 is based on HOEs, and FIG. 7 is based on mirrors. FIG. 8 is based on an additional HOE 180 that is recorded on another layer on the substrate 182.

As shown in FIG. 6, an embodiment of a Y expander waveguide 137 is an additional structure attached to the transparent waveguide substrate 138 and input VHOE 136. The expander is comprised of a transparent thick substrate (at least 3-4 mm) 130 with two films 128 and 132 containing HOE on either side of the substrate. The Y expander is separated from the waveguide substrate by spacers 134 to ensure an air gap. In this embodiment, the light engine input 126 is incident upon a Y-expander with 5 output images. The diffraction efficiencies of the 5 HOEs are designed so the 5 output images have the same intensity. The input HOE 140 will diffract 124 40% in both directions with 20% being transmitted. The output HOEs 122 closest to the image engine input should reflect 50% of the light and the last HOEs 120 will have close to 100% diffraction efficiency to reflect the remaining light. The HOEs in the design should have a sufficient acceptance angle to reflect full angular cone of the image in vertical direction (15-25°). This requires a holographic material with a suitable Δn value (min. 0.05) and can become a limiting factor for achieving a large vertical FOV. To eliminate gaps between multiple inputs, a one-dimensional diffuser 146 in the Y-direction is added to the light engine 142 between the light source 148 and the display 144.

The design of a Y expander 168 shown in FIG. 7 removes the Δn requirement described above by using a mirror-based system. In this embodiment, the light engine input 152 enters the waveguide substrate 166 through the incoupling VHOE 150 at an angle from the normal 164 of approximately 30 degrees. Angle 164 is also the angle of the right triangle in the prism mirror assembly 158. A resonator comprised of a 100% reflection mirror 154 and a gradient mirror 156 reflects the light multiple times along its path and duplicate the image engines pupil multiple times. These images propagate parallel to each other at a slanted angle 164 in the YZ plane of the WG. The 100% mirror positioned on the opposite side the prism assembly 158 straightens this slanted angle to provide normal input of the images into the incoupling VHOE 150. The prism assembly can be either a solid prism of the appropriate index or an assembly 162 created from multiple pieces of glass and filled with an index liquid 160. To eliminate gaps between multiple inputs, a one-dimensional diffuser 174 in the Y-direction is added to the light engine 170 between the light source 176 and the display 172.

Another embodiment of a Y expander 180 covers the area between incoupling and outcoupling VHOEs plus part or the whole area over the output VHOE with a low DE (5% to 15%) and low spatial frequency transmission grating producing diffraction angles between 25° and 45° recorded on an additional film layer as shown on FIG. 8. In this embodiment, one layer of holographic film is applied to the substrate 182 and contains an input VHOE 188, and Y expander 180 and an output VHOE 184 and works for all angular ranges. Some part or all of the output VHOE 182 will overlap with the Y expander 180. The image from the light engine is in-coupled into the waveguide through the input VHOE bounces between substrate surfaces at TIR (direction perpendicular to the page in FIG. 8) and at each bounce it passes through the Y expander 180, reflects off the surface through TIR and passes back through the grating. Each crossing of the grating splits the beam into 0-th and 1-st diffraction orders, so that beam reflected from the substrate surface with the grating splits into four beams: two propagating into direction of 0-th diffraction order and two—into direction of ±1st diffraction order 190 and these pair are separated at distance d obtained from the following equation $$d = 4*t*\tan\alpha*\tan\frac{\theta}{2} \quad (4)$$

where t is the WG thickness, α is the TIR propagation angle, θ is the diffraction angle of the grating.

Multiple bounces result in both spreading out vertically the beams propagating in the direction of 0-th order (input beam direction) and homogenization of their brightness. Thus, the grating diffraction angle θ defines the rate of pupil expansion 186 in vertical direction along the propagation path of the beam and it is not difficult to see that grating with length L will increase the pupils size $P_v$ to $$P_v = L*\tan\theta \quad (5)$$

Full Color Image Combiner with Expanded H and V FOV

In an embodiment, a full color image combiner includes at least first and second pairs of incoupling and outcoupling VHOEs spaced apart and overlapped on an optically transparent waveguide. Each VHOE includes at least R, G and B gratings in a single optical film with each grating having a bandwidth of at least 10 nm. The first and second pairs of incoupling and outcoupling VHOEs accept light within angular regions that are contiguous but non-overlapping to increase the effective angular region of the image computer and expand the horizontal FOV. A Y-expander duplicates, with uniform intensity, the pupil of the light engine to maximize the vertical eye box. The image combiner exhibits a horizontal FOV of at least 28 degrees (preferably at least 40 degrees) and a vertical FOV of at least 20 degrees (preferably at least 25 degrees) producing a diagonal FOV of at least 35 degrees and preferably at least 50 degrees. They eye box is at least 20 mm×10 mm and the image combiner satisfies the four objects and five issues previously discussed for a successful image combiner system.

Printing Process.

Figure 9A:
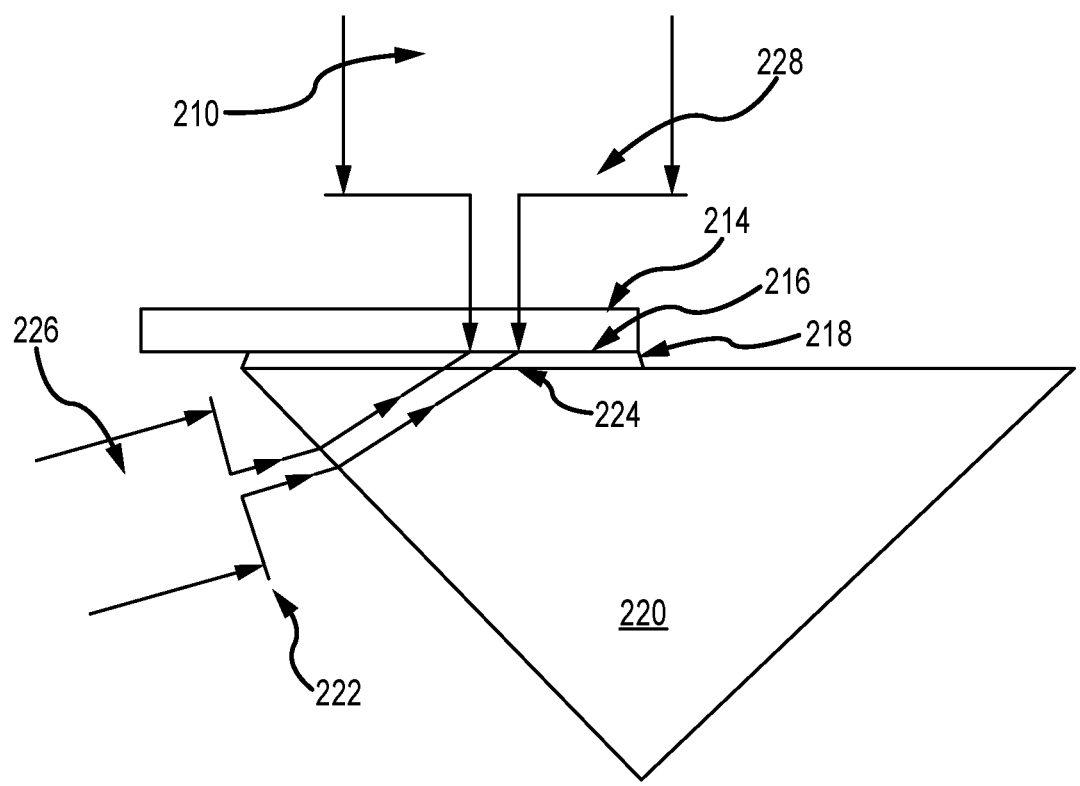
FIGS. 9a and 9b are diagrams of embodiments of recording setups and fixtures for recording the incoupling and outcoupling VHOEs, respectively.
Figure 9B:
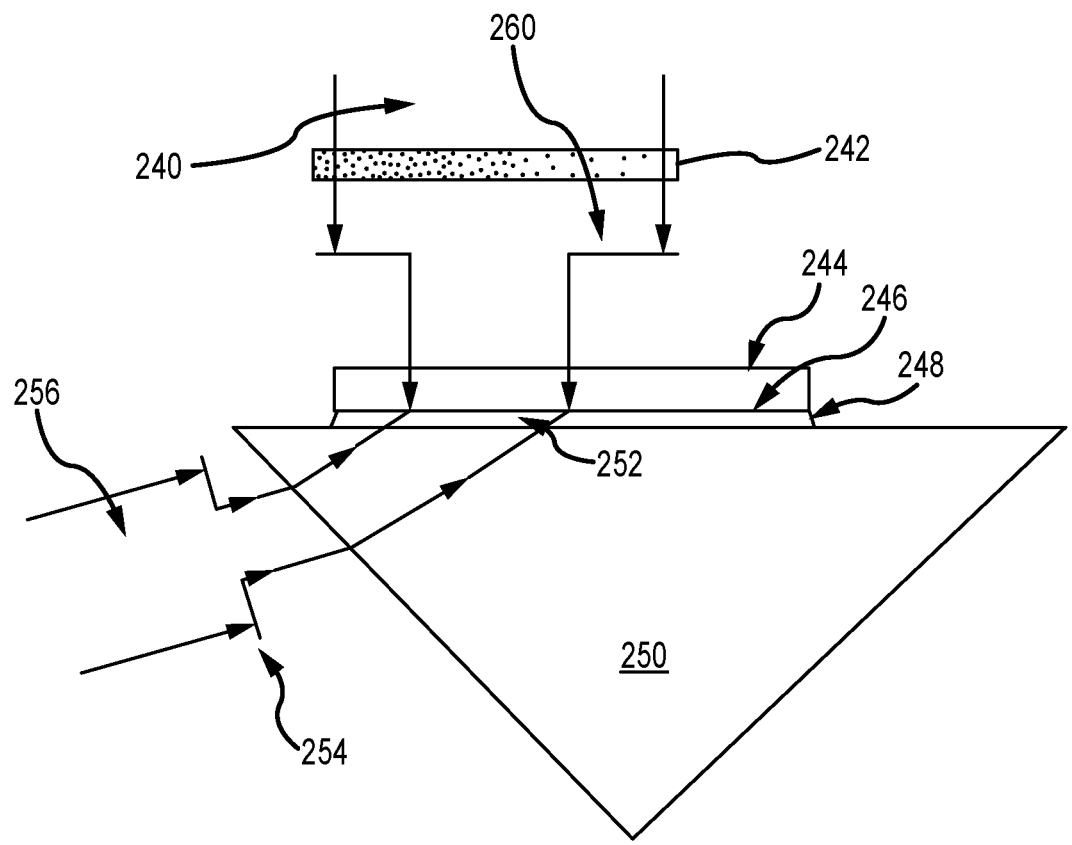

As was stated above, in-coupling and out-coupling images from reflection VHOEs that are recorded with the same geometry 210, 226, 224, 240, 256, 252, will keep the same input and output angles for each ray of the image and allow for the elimination of chromatic aberrations in the image. Both incoupling and outcoupling VHOEs include three plain (without optical power) RGB holograms overlapped in one film and also recorded with the same geometry. To achieve maximum DE for all three RGB VHOEs, they're recorded simultaneously using three RGB lasers. As was also mentioned above, each pair of in-coupling/out-coupling elements approximately 14° horizontal FOV. In order to provide wide horizontal FOV, more layers could be combined in such a way that each layer covers adjacent angular ranges. The recording laser wavelengths were single frequency 457 nm, 532 nm, and 635 nm and the recording material was 10 μ Covestro photo-polymer film 216, 246 sensitive to the whole visible range. The photopolymer was laminated on a 0.7 mm soda-lime glass substrate 214, 244 with 1λ flatness and parallelism better than 10 arcminutes. The typical recording process of the VHOEs covering one angular range consisted of the following steps:

1. Substrate Preparation
    Cutting
    Cleaning
2. Photopolymer Lamination
3. Exposure
    Recording setup is schematically shown in the FIG. 9. In-coupling and out-coupling VHOEs are being recorded sequentially as it is shown in the figure as a) and b) respectively. After exposing the area set for the in-coupling VHOE 224 using recording beams 210 and 226 illuminated through masks 222 and 228 (FIG. 9a) the sample is parallel shifted for further exposure of the area set for the out-coupling VHOE 252 using recording beams 240 and 256 illuminated through masks 254 and 260 (FIG. 9b). In order to in-couple free-space recording beam into the substrate mode, we used a coupling prism 220, 250, which had optical contact with the sample through matching liquid 218, 248 (see FIG. 9a). In order to make gradient distribution of the DE on the outcoupling VHOE required for homogenization of the image brightness we used gradient neutral density filter 242 in the path of one of the recording beam (see FIG. 9b).

4. Photopolymer Bleaching

To fix the recorded holograms and make the whole photopolymer film transparent (bleaching process) the sample should be exposed by a beam with continuous spectrum in the range between near UV (~375 nm) and red (650 nm). We apply ~30 J/cm$^2$ radiation dose using the output of Xenon lamp.

5. Photopolymer Protection

To protect the film from environmental damage we used 100 μ, cover glass laminated on the polymer using optical quality double-sticky acrylic adhesive. The cover glass allows also eliminate distortion of the image bouncing between the outer surfaces of the sample because the glass has much higher surface flatness then the photo-polymer film.

This process describes the first stage of fabrication of the combiner, which provides horizontal FOV for one angular range (~14°). To add more angular ranges, we laminate another photo-polymer film on the top of the cover glass and repeat steps 3 through 5 for the desired angular range centered on the new input angle.

To expand the FOV of the combiner vertically (Y-expander), we used the following three techniques (see also description above):

1. Duplication of the Image Engine Pupil in the Vertical Direction Using VHOEs

This Y expanding element was recorded on DCG layer deposited on 3 mm thick substrate using three overlapped RGB VHOEs. Using volumetric RGB holograms allowed us to treat each color separately and thus eliminate color distortion in the duplicated images. DCG was used due to its high Δn, which provides wide acceptance angle than lower Δn material. The larger acceptance angle allows a larger vertical FOV. The proper values of the diffraction efficiencies providing equal brightness for all duplicated images (see FIG. 6) was achieved using, as above, a gradient mask.

2. Duplication of the Image Engine Pupil in the Vertical Direction Using Mirrors The elements for this type of Y expander shown in FIG. 7, was custom ordered from Edmund Optics.

3. Pupil Expansion in Vertical Direction Using HOE Recorded in Additional Layer Deposited on the WG Substrate The Y expanders made in the first two techniques don't have optical contact with the WG substrate and consequently these elements can be fabricated separately and then attached to the in-coupling area of the WG. The Y-expander proposed in the third technique represents a HOE recorded on an additional layer deposited on the WG substrate and consequently both X and Y expanding elements should be made in one fabrication process. This Y expanding HOE can be done using either VHOE recorded on photopolymer or surface relief grating. Depending on the type of hologram, we have to add the following steps to the process described above:

VHOE on Photopolymer
1. Photopolymer Lamination
2. Exposure

We recorded three RGB transmission VHOEs with the same geometry with the orientation of the diffraction fringes parallel to the X direction. The period of the grating defines the cone of Y expansion 190 (see FIG. 8), which we choose to be 45.

3. Photopolymer Bleaching
The same as above
4. Photopolymer Protection
The same as above HOE on Surface Relief Grating
1. Photoresist Deposition on One of the WG Surface
1818 Shipley photoresist
2. Exposure
442 nm output of He—Cd laser
3. Developing
351 Microposit Developer
4. Deposition of low refractive index layer
n=1.32
5. Photoresist Protection
Same as above using double sticky film and 100 μm 306 cover glass While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A waveguide image combiner for combining light from real imagery with light from a light engine to present augmented reality to a viewer, said waveguide imager combiner comprising:
   a first optically transparent substrate having top and bottom surfaces;
   at least first and second pairs of incoupling and outcoupling reflective volume holographic optical elements (VHOEs) spaced apart horizontally and overlaid on the top surface of the first optically transparent substrate, wherein said incoupling VHOEs are configured to simultaneously diffract light from the light engine in at least first and second non-overlapping but contiguous angular ranges horizontally into the substrate where the light travels through total internal reflection (TIR) to the outcoupling VHOEs which diffract the light to the viewer with a horizontal FOV equal to the extent of the at least first and second angular ranges, wherein said reflective VHOEs transmit light from the real imagery in the visible spectrum so that light from real imagery is combined with the light from the light engine to create an integrated image that is simultaneously presented over the entire horizontal FOV; and
   a Y-expander configured to duplicate a pupil of the light engine vertically N time where N is an integer of at least two such that each duplicate image has an intensity of 1/N, said at least first and second pairs of incoupling and outcoupling reflective VHOEs extending vertically on the top surface of the substrate, said incoupling reflective VHOEs positioned to capture the N copies of the pupil which expands to fill the vertical extent of the outcoupling reflective VHOEs and present a vertical FOV equal to N times the FOV possible with a single pupil.

2. The waveguide image combiner of claim 1, where the light from the light engine provides auxiliary content that comprises at least one of computer generated imagery, a live or recorded video feed, text or digital or analog information.

3. The waveguide image combiner of claim 1, wherein the light from the light engine has a bandwidth of between 10 nm and 30 nm.

4. The waveguide image combiner of claim 1, wherein said at least first and second pairs of incoupling and outcoupling reflective VHOEs each comprise a single grating tuned to a center wavelength with a bandwidth of between 10 nm and 30 nm.

5. The waveguide image combiner of claim 1, wherein said at least first and second pairs of incoupling and outcoupling reflective VHOEs each comprise three gratings in a single optical film tuned to first, second and third center wavelengths, respectively, and each with a bandwidth of at least 10 nm, wherein the first, second and third center wavelengths are simultaneously combined in the horizontal FOV and vertical FOV.

6. The waveguide image combiner of claim 5, wherein the first, second and third center wavelengths correspond to red, green and blue center wavelengths, respectively.

7. The waveguide image combiner of claim 1, wherein the horizontal FOV is at least 28 degrees, the vertical FOV is at least 20 degrees and a diagonal FOV is at least 35 degrees.

8. The waveguide image combiner of claim 1, wherein the horizontal FOV is at least 40 degrees, the vertical FOV is at least 25 degrees and a diagonal FOV is at least 50 degrees.

9. The waveguide image combiner of claim 1, wherein an eye box is at least 20 mm in the horizontal and 10 mm in the vertical.

10. The waveguide image combiner of claim 1, wherein the outcoupling VHOEs are configured with a gradient in their diffraction efficiency in the horizontal to provide uniform light intensity in the horizontal FOV.

11. The waveguide image combiner of claim 1, wherein the Y expander direct >80% of the light from the light engine into the substrate.

12. The waveguide image combiner of claim 1, wherein the Y expander comprises:
a second optically transparent substrate having a thickness of at least 3 mm;
first and second optical films on opposite sides of the optically transparent substrate;
a plurality of spacers that create an airgap between the first and second optically transparent substrates;
an input HOE formed in a central region of the first optical film adjacent the airgap;
a plurality N-1 of output HOEs in the second optical film to either side of the input HOE,
wherein the diffraction efficiencies of the input HOE and the plurality of output HOEs are selected to generate N duplicate images with intensity of 1/N.

13. The waveguide image combiner of claim 1, wherein the Y expander comprises:
a prism mirror assembly on the backside of the first optically transparent substrate, wherein light from the light engine enters the first optically transparent substrate at a slanted angle in the Y direction equal to the angle of a right triangle in the prism mirror assembly so that light reflected off of the prism is normal to the substrate; and
a resonator on the front side of the first optically transparent substrate, said resonator including a 100% reflection mirror and a gradient mirror configured to reflect light from the light engine multiple times to generate N duplicate images with intensity 1/N that propagate parallel to each other at the slanted angle.

14. A waveguide image combiner for combining light from real imagery with light from a light engine to present augmented reality to a viewer, said waveguide imager combiner comprising:
an optically transparent substrate having top and bottom surfaces;
at least first and second pairs of incoupling and outcoupling reflective volume holographic optical elements (VHOEs) spaced apart horizontally and overlaid on the top surface of the optically transparent substrate, wherein said incoupling VHOEs are configured to diffract light from the light engine in at least first and second non-overlapping but contiguous angular ranges horizontally into the substrate where the light travels through total internal reflection (TIR) to the outcoupling VHOEs which diffract the light to the viewer with a horizontal FOV equal to the extent of the at least first and second angular ranges, wherein said reflective VHOEs transmit light from the real imagery in the visible spectrum so that light from real imagery is combined with the light from the light engine to create an integrated image; and
a Y-expander configured to duplicate a pupil of the light engine vertically N time where N is an integer of at least two such that each duplicate image has an intensity of 1/N said at least first and second pairs of incoupling and outcoupling reflective VHOEs extending vertically on the top surface of the substrate, said incoupling reflective VHOEs positioned to capture the N copies of the pupil which expands to fill the vertical extent of the outcoupling VHOE reflective VHOEs and present a vertical FOV equal to N times the FOV possible with a single pupil, wherein the Y expander comprises:
an optical film on the first optically transparent substrate the covers an area between the at least first and second pairs of incoupling and outcoupling reflecting VHOEs and at least a portion of the outcoupling VHOEs, said optical film comprising a transmission grating with a diffraction efficiency of less than 10%,
wherein as light from the light engine bounces between surfaces of the first optically transparent substrate at TIR it passes through the transmission grating, reflects off the surfaces and passes back through the grating, each passing through the grating splitting the light into $0^{th}$ and $1^{st}$ diffraction orders such that multiple bounces spreads and homogenizes the beams propagating in the direction of the $0^{th}$ order to produce N duplicate images with intensity 1/N.

15. A waveguide image combiner for combining light from real imagery with colored light from a light engine to present augmented reality to a viewer, said waveguide imager combiner comprising:
a first optically transparent substrate having top and bottom surfaces; and
at least first and second pairs of incoupling and outcoupling reflective volume holographic optical elements (VHOEs) spaced apart horizontally and overlaid on the top surface of the optically transparent substrate, wherein said incoupling VHOEs include first, second and third gratings in a single optical film configured to simultaneously diffract colored light from the light engine including first, second and third components at different wavelgnths each having a bandwidth of at least 10 nm simultaneously in first and second non-overlapping but contiguous angular ranges horizontally into the substrate where the light travels through total internal reflection to the outcoupling VHOEs which diffract the light to the viewer with a horizontal FOV equal to the extent of the first and second angular ranges, wherein said reflective VHOEs transmit light from the real imagery in the visible spectrum so that light from real imagery is combined with the light from the light engine to create an integrated color image that is presented simultaneously over the entire horizontal FOV.

16. The waveguide image combiner of claim 15, wherein the outcoupling VHOEs are configured with a gradient in their diffraction efficiency in the horizontal to provide uniform light intensity in the horizontal FOV.

17. The waveguide image combiner of claim 15, wherein the first, second and third gratings and components correspond to red, green and blue, respectively.

18. A waveguide image combiner for combining light from real imagery with light from a light engine to present augmented reality to a viewer, said waveguide imager combiner comprising:
- a single optically transparent substrate having top and bottom surfaces;
- at least a first pair of incoupling and outcoupling reflective volume holographic optical elements (VHOEs) each formed in a single optical film, spaced apart horizontally and overlaid on the top surface of the optically transparent substrate, wherein said incoupling VHOE is configured to diffract light from the light engine in a first angular range horizontally into the substrate where the light travels through total internal reflection (TIR) to the outcoupling VHOE which diffracts the light to the viewer within a horizontal FOV, wherein said reflective VHOEs transmit light from the real imagery in the visible spectrum except for at the wavelengths of light from the light engine so that light from real imagery is combined with the light from the light engine to create an integrated image; and
- a Y-expander on the single optically transparent substrate, said Y-expander configured to duplicate a pupil of the light engine vertically N time where N is an integer of at least two such that each duplicate image has an intensity of 1/N, said at least first pair of incoupling and outcoupling reflective VHOEs extending vertically on the top surface of the substrate with said incoupling reflective VHOE positioned to capture the N copies of the pupil which expands to fill the vertical extent of the outcoupling VHOE and presents a vertical FOV of at least 25 degrees and equal to N times the FOV possible with a single pupil, wherein said Y-expander is configured to direct >80% of the light from the light engine into the substrate.

19. The waveguide image combiner of claim 18, wherein the Y expander comprises:
- a prism mirror assembly on the backside of the single optically transparent substrate, wherein light from the light engine enters the single optically transparent substrate at a slanted angle in the Y direction equal to the angle of a right triangle in the prism mirror assembly so that light reflected off of the prism is normal to the substrate; and
- a resonator on the front side of the single optically transparent substrate, said resonator including a 100% reflection mirror and a gradient mirror configured to reflect light from the light engine multiple times to generate N duplicate images with intensity 1/N that propagate parallel to each other at the slanted angle.

20. A waveguide image for combining light from real imagery with light from a light engine to present augmented reality to a viewer, said waveguide imager combiner comprising:
- an optically optically transparent substrate having top and bottom surfaces;
- at least a first pair of incoupling and outcoupling reflective volume holographic optical elements (VHOEs) each formed in a single optical film, spaced apart horizontally and overlaid on the top surface of the optically transparent substrate, wherein said incoupling VHOE is configured to diffract light from the light engine in a first angular range horizontally into the substrate where the light travels through total internal reflection (TIR) to the outcoupling VHOE which diffracts the light to the viewer within a horizontal FOV, wherein said reflective VHOEs transmit light from the real imagery in the visible spectrum except for at the wavelengths of light from the light engine so that light from real imagery is combined with the light from the light engine to create an integrated image; and
- a Y-expander configured to duplicate a pupil of the light engine vertically N time where N is an integer of at least two such that each duplicate image has an intensity of 1/N, said at least first and second pairs of incoupling and outcoupling reflective VHOEs extending vertically on the top surface of the substrate, said incoupling reflective VHOEs positioned to capture the N copies of the pupil which expands to fill the vertical extent of the outcoupling reflective VHOEs and present a vertical FOV equal to N times the FOV possible with a single pupil, wherein the Y expander comprises:
- an optical film on the first optically transparent substrate the covers an area between the at least first pair of incoupling and outcoupling reflecting VHOEs and at least a portion of the outcoupling reflective VHOE, said optical film comprising a transmission grating with a diffraction efficiency of less than 10%,
- wherein as light from the light engine bounces between surfaces of the first optically transparent substrate at TIR it passes through the transmission grating, reflects off the surfaces and passes back through the grating, each passing through the grating splitting the light into $0^{th}$ and $1^{st}$ diffraction orders such that multiple bounces spreads and homogenizes the beams propagating in the direction of the $0^{th}$ order to produce N duplicate images with intensity 1/N.

* * * * *